(12) United States Patent
Grepaly et al.

(10) Patent No.: US 12,129,939 B2
(45) Date of Patent: Oct. 29, 2024

(54) EARLY LIFE EROSION TRACKING LAYER FOR HIGH PRESSURE FRACKING HOSES

(71) Applicant: ContiTech USA, Inc., Fairlawn, OH (US)

(72) Inventors: Istvan Grepaly, Budapest (HU); Tamas Mezo, Szeged (HU); Gergely Szekely, Houston, TX (US); Zsolt Kovacs, Szeged (HU); Jeno Kotai, Szeged (HU); Tibor Nagy, Budapest (HU)

(73) Assignee: ContiTech USA, Inc., Fairlawn, OH (US)

( * ) Notice: Subject to any disclaimer, the term of this patent is extended or adjusted under 35 U.S.C. 154(b) by 0 days.

(21) Appl. No.: 17/755,220

(22) PCT Filed: Nov. 16, 2020

(86) PCT No.: PCT/US2020/060647
§ 371 (c)(1),
(2) Date: Apr. 22, 2022

(87) PCT Pub. No.: WO2021/101820
PCT Pub. Date: May 27, 2021

(65) Prior Publication Data
US 2022/0373111 A1    Nov. 24, 2022

Related U.S. Application Data

(60) Provisional application No. 62/936,631, filed on Nov. 18, 2019.

(51) Int. Cl.
*F16L 57/06* (2006.01)
*F16L 11/12* (2006.01)
*F16L 11/08* (2006.01)

(52) U.S. Cl.
CPC .............. *F16L 11/124* (2013.01); *F16L 57/06* (2013.01); *F16L 11/081* (2013.01)

(58) Field of Classification Search
CPC .......... F16L 11/12; F16L 11/08; F16L 11/081; F16L 57/06; F16L 11/124; G01D 7/005
(Continued)

(56) References Cited

U.S. PATENT DOCUMENTS 2,330,651 A  *  9/1943  Welger .................. B29D 23/18
                                                          138/133
3,169,552 A  *  2/1965  Fawick ................. F16L 11/081
                                                          138/133

(Continued)

FOREIGN PATENT DOCUMENTS

| CN | 102483190 A | 5/2012 |
| CN | 106461147 A | 2/2017 |

(Continued)

OTHER PUBLICATIONS

International Search Report dated Feb. 3, 2021 of International Application PCT/US2020/060647 on which this application is based.

(Continued)

*Primary Examiner* — Patrick F Brinson
(74) *Attorney, Agent, or Firm* — Gregory Adams; Richard A. Wolf

(57) ABSTRACT

A rubber hose includes a distinctly colored inner wear indicator integrated into its liner, wherein a distance b of the inner wear indicator from the inner surface of the liner is less than 40% of the liner's thickness v, and height h of the wear indicator, measured perpendicularly to a longitudinal axis of the hose, falls between 1% to 90% of liner thickness v, or even from 10% to 40% of the liner thickness v. The inner wear indicator may have concentric sectional surface area of the inner wear indicator may even gradually decrease in the (Continued)

radial direction as a function of distance from the longitudinal axis. The rubber hose may be connected at one end to a plunger pump and connected at a second to a common manifold, in an oilfield pump system, or used in any hose application in an oilfield fluid pump system.

16 Claims, 8 Drawing Sheets

(58) Field of Classification Search
USPC ....... 138/104, 174, 172, 140, 137, 138, 143; 116/208
See application file for complete search history.

(56) References Cited

U.S. PATENT DOCUMENTS

| | | | |
|---|---|---|---|
| 3,885,594 A * | 5/1975 | Tanaka | F16L 11/24 138/132 |
| 4,461,324 A * | 7/1984 | Schneider | F16L 57/06 138/138 |
| 4,474,217 A | 10/1984 | DeMarse et al. | |
| 5,228,478 A | 7/1993 | Kleisle | |
| 5,690,146 A | 11/1997 | Stammen | |
| 6,244,303 B1 * | 6/2001 | Adams | F16L 11/081 138/132 |
| 6,386,731 B1 | 5/2002 | Cheng | |
| 2012/0222765 A1 | 9/2012 | Alexander et al. | |
| 2013/0061971 A1 | 3/2013 | Chamberland | |
| 2014/0251486 A1 * | 9/2014 | Gunsing | F16L 57/06 138/139 |
| 2016/0369926 A1 | 12/2016 | Shuck | |
| 2017/0130905 A1 | 5/2017 | Reck et al. | |

FOREIGN PATENT DOCUMENTS

| | | |
|---|---|---|
| DE | 202018101197 U1 | 6/2019 |
| EP | 0918967 B1 | 2/2000 |
| EP | 2748503 A1 | 7/2014 |
| EP | 2932144 B1 | 9/2017 |
| JP | 3440658 B2 | 8/2003 |
| WO | 2000061472 A1 | 10/2000 |
| WO | 2011137539 A1 | 11/2011 |

OTHER PUBLICATIONS

Chinese Office Action dated May 29, 2024 of counterpart CN application.
Canadian Office Action dated Jun. 26, 2024 of counterpart CA application No. 3,156,684.

* cited by examiner

EARLY LIFE EROSION TRACKING LAYER FOR HIGH PRESSURE FRACKING HOSES

FIELD

The field to which the disclosure generally relates to rubber hoses having high abrasion resistance and erosion detection capability.

BACKGROUND

This section provides background information to facilitate a better understanding of the various aspects of the disclosure. It should be understood that the statements in this section of this document are to be read in this light, and not as admissions of prior art.

In oilfield applications, pump assemblies are used to pump a fluid from the surface of the well site to a wellbore at extremely high pressures. Such applications include hydraulic fracturing, cementing, and pumping through coiled tubing, among other applications. In the example of a hydraulic fracturing operation, a multi-pump assembly is often employed to direct an abrasive containing fluid, or fracturing fluid, through a wellbore and into targeted regions of the wellbore to create side "fractures" in the wellbore. To create such fractures, the fracturing fluid is pumped at extremely high pressures, sometimes in the range of 10,000 to 15,000 psi or more. In addition, the fracturing fluid contains an abrasive proppant which both facilitates an initial creation of the fracture and serves to keep the fracture "propped" open after the creation of the fracture. These fractures provide additional pathways for underground oil and gas deposits to flow from underground formations to the surface of the well. These additional pathways serve to enhance the production of the well.

Plunger pumps are typically employed for high pressure oilfield pumping applications, such as hydraulic fracturing operations. These pumps may be linked to one another through a common manifold, which mechanically collects and distributes the combined output of the individual pumps. The pumps are individually linked to the common manifold typically by steel pipe conduits and chiksans.

Due to the abrasive nature of the fluids delivered from the pumps to the common manifold at high pressures, erosion of the interior of the steel pipes can occur over time in use. Such erosion can lead to unsafe conditions where the steel pipe can be breached in leak the release the pressurized abrasive fluid.

Hence, it is desirable to have conduits with sufficient abrasion resistance and improved erosion detection, such need met, at least in part, with embodiments according to this disclosure.

SUMMARY

This section provides a general summary of the disclosure, and is not a necessarily a comprehensive disclosure of its full scope or all of its features.

In a first aspect of the disclosure, a rubber hose includes a distinctly colored inner wear indicator integrated into its liner, wherein a distance b of the inner wear indicator from the inner surface of the liner is less than 40% of the liner's thickness v, and height h of the wear indicator, measured perpendicularly to a longitudinal axis of the hose, falls between 1% to 90% of liner thickness v. In some aspects, the distance b of the inner wear indicator from the inner surface of the liner is equal to, or less than, 20% the liner thickness v, and the height h of the wear indicator, measured perpendicularly to the hose longitudinal axis, is from 10% to 40% of the liner thickness v. The rubber hose may further include one or more embossed rubber grooves in the liner which function to wash away as the liner is exposed to the high velocity fluids.

In some cases, a concentric sectional surface area of the inner wear indicator changes relative the radial distance from the longitudinal axis, and the concentric sectional surface area of the inner wear indicator may even gradually decrease in the radial direction as a function of distance from the longitudinal axis.

According to some aspects of the disclosure, the inner wear indicator has profile which is applied in a spiral and has a triangular cross-section, or the inner wear indicator profile is applied in a spiral and has a multiple triangular cross-section. Also, the inner wear indicator in the rubber hose may have a triangular cross-section laid in ring-like shape, perpendicular to the longitudinal axis. The inner wear indicator may even have a multiple triangular cross-section laid in a ring-like shape, placed perpendicular to the longitudinal axis. In some other cases, the rubber hose has a rectangular cross-section laid in ring-like shape, perpendicular to the longitudinal axis, while in some other cases, the inner wear indicator in the rubber hose consists of essentially conical elements placed in a spot-like pattern.

According to some other aspects of the disclosure, the rubber hose further includes an additional outer wear indicator placed radially relative the longitudinal axis and more outward than the inner wear indicator. The sectional surface area of the outer wear indicator may gradually increase in a radial direction relative the longitudinal axis as a function of distance from the longitudinal axis.

According to some further aspects of the disclosure, the rubber hose is connected at one end to a plunger pump and connected at a second to a common manifold, in an oilfield pump system, or the rubber hose may be used in any hose application in an oilfield fluid pump system.

DETAILED DESCRIPTION

Figure 1:
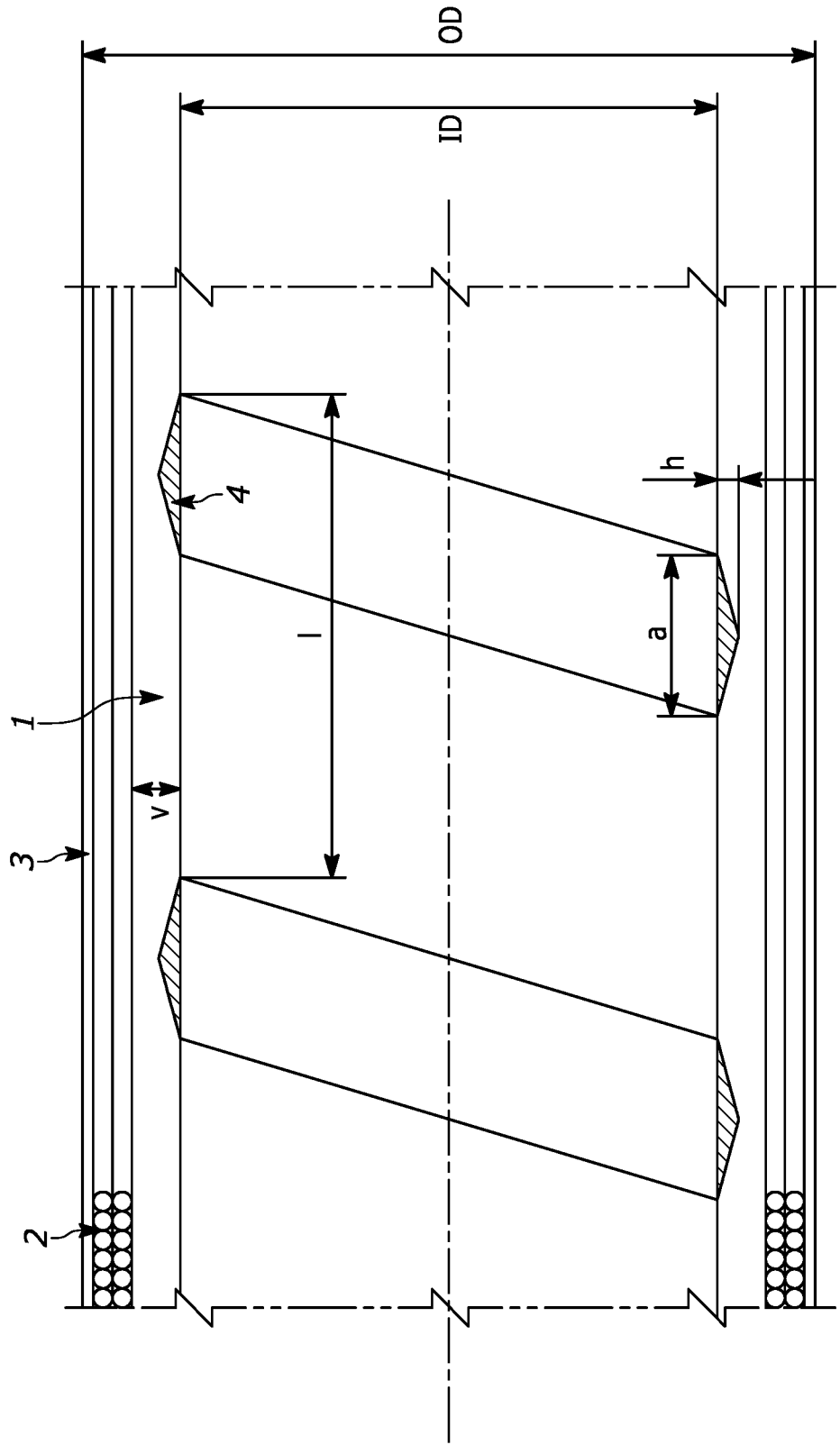
FIG. 1 shows a hose having a longitudinal section that has a liner 1, reinforcing layers 2 and a rubber cover 3.

The following description of the variations is merely illustrative in nature and is in no way intended to limit the scope of the disclosure, its application, or uses. The description and examples are presented herein solely for the purpose of illustrating the various embodiments of the disclosure and should not be construed as a limitation to the scope and applicability of the disclosure. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that an amount or value range listed or described as being useful, suitable, or the like, is intended that any and every amount or value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

Embodiments according to the disclosure allow an operator to visually determine the level of erosion on a hose rubber liner at an early stage of service life, calculate the remaining lifespan of the hose, allowing for maintenance and replacement planning, resulting savings on operational expenditures. The embodiments provide security for operations as based on the early stage erosion tracking layer they can extrapolate the expected service life of the hose for their particular operation conditions. Having an early life erosion tracking layer eventually leads to safer operations, as it clearly indicates the condition of the hose for even an untrained eye.

Embodiments of the disclosure provide advantage over existing state of the art solutions which are not proven to work in a high pressure (15,000 or greater psi) and high fluid velocity (over 16 meter/second) of abrasive fluid. The disadvantage of existing state of the art solutions is that they do not provide continuous information regarding the state of wear, and they only alert the user after a pre-set extent of wear has been reached. This means that in most cases, they alert the user only when the hose needs to be replaced soon. Unplanned hose replacements can disrupt the transportation process and initiate significant additional costs. Embodiments of the disclosure overcome these problems, and the embodiments inform the user of any hose liner wear in its early stages. This enables the user to calculate the rate of wear, while the wear is still in its early stages, and thus allow the user to pre-plan hose replacements and carry them out at their convenience.

According to the disclosure, one or more wear indicator element(s) is/are placed within the liner (innermost layer) of the rubber hose, and colored differently from the liner itself. As an example, wear indicator element could be a rubber profile laid spirally. In case of multiple elements, these could be placed in ring patterns perpendicular to the hose axis, or spotted patterns are also possible. In some aspects, the wear indicator element or elements are placed on the inner surface of the hose liner, but may also be placed completely inside of the liner. In some case, the wear indicator element or elements cover at most about 50% of the liner's inner surface, or even cover no more than about 20%. The wear indicator element or elements have established dimensions in the radial direction, and in some aspects, the radial dimension of the wear indicator element or elements make up from about 1% to about 90% of the liner's thickness. In some embodiments, the axial dimension of the wear indicator element or elements and/or the dimension perpendicular to the hose axis (tangent direction) gradually decreases radially, and thus the visible size of the wear indicator (on the inside of the hose) gradually decreases as the level of wear progresses. Knowing the geometry of the wear indicator and the changes in size thereof (visible on the inside of the hose) the rate of wear can be calculated.

The one or more colored wear indicator element(s) of the liners allows for a more simple and reliable inspection with low cost optical devices, such as borescope, small portable cameras (e.g. GoPro) or even mobile phones.

In FIGS. 1 through 7, the following identifiers apply:
1 hose liner
2 reinforcing layer(s)
3 cover
4 distinctly colored wear indicator
5 distinctly colored outer wear indicator
6 stiffening helix
a width of distinctly colored wear indicator 4 profile when hose is brand new
$a_1$ width of distinctly colored wear indicator 4 spot when hose is brand new
h height of distinctly colored wear indicator 4 profile when hose is brand new
I screw pitch of distinctly colored wear indicator 4 profile
$I_1$ repeat distance of distinctly colored wear indicator 4 profile in the axial direction of the hose
t wear time
$a_t$ the remaining width of the wear indicator 4 profile after t time has passed
$t_c$ the full time remaining until the hose completely wears out $a_x$ the remaining width of the outer wear indicator 5 profile at x time b the radial distance between the inner surface of the hose and the wear indicator ID the inner diameter of the hose OD the outer diameter of the hose v the thickness of the liner Now referencing FIG. 1, in one embodiment, a hose is depicted where on a longitudinal section of a rubber hose, the hose has a liner 1, reinforcing layers 2 and a rubber cover 3. An integrated inner wear indicator 4 profile of distinct color is placed on the inner side of the liner, with a width of a, a height of h and a triangular cross section, with a spiral form and a pitch of I.

Figure 2:
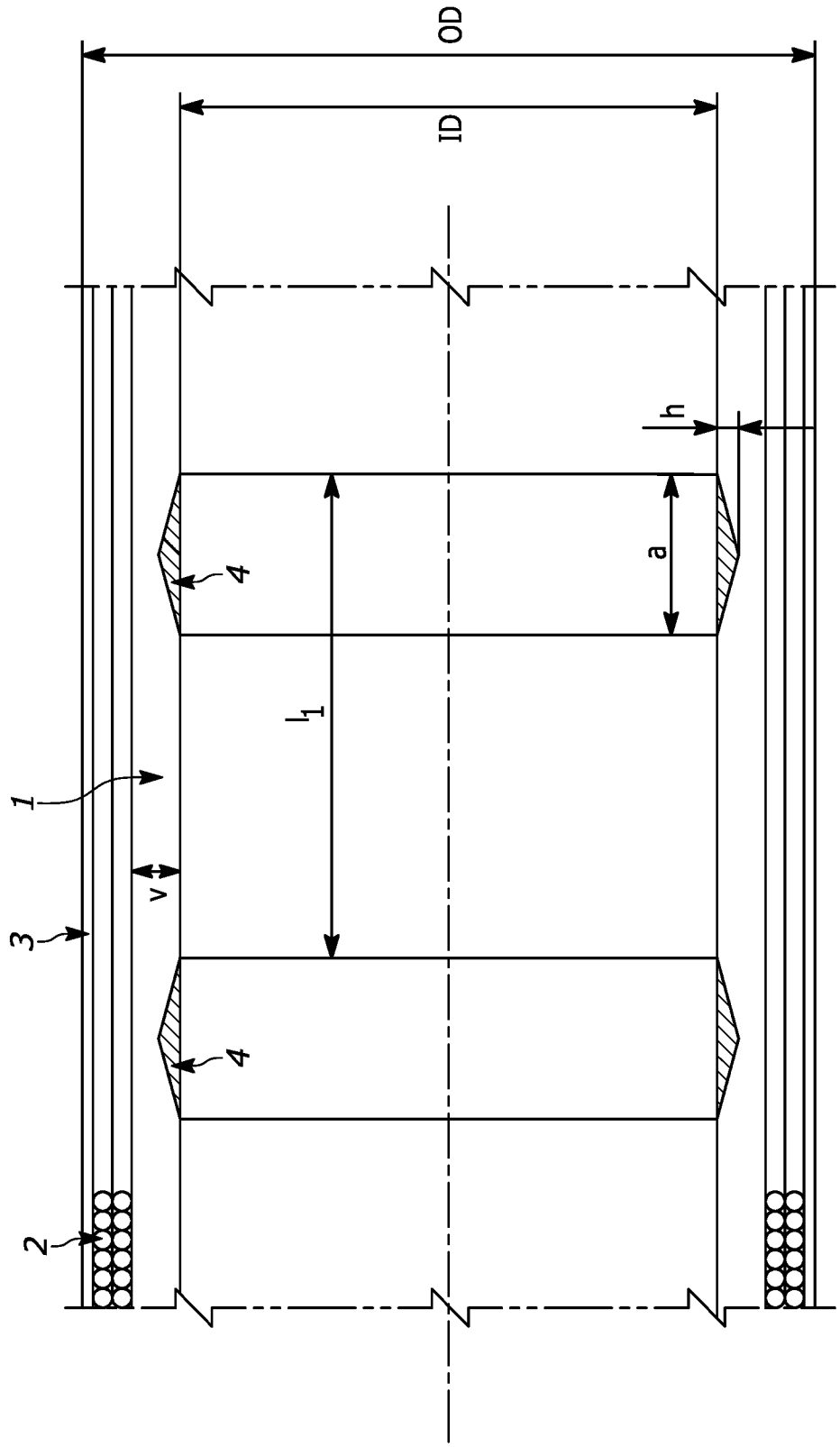
FIG. 2 shows a longitudinal section of a rubber hose that has a liner 1, reinforcing layers 2 and a rubber cover 3.

FIG. 2 shows another possible implementation according to the disclosure on a longitudinal section of a rubber hose, which also has a liner 1, reinforcing layers 2 and a rubber cover 3. An integrated inner wear indicator 4 profile of distinct color is placed on the inner side of the liner with a width of a, a height of h and a triangular cross section, perpendicular to the hose axis in a tangential direction and with a repeat distance of $I_1$.

Figure 3:
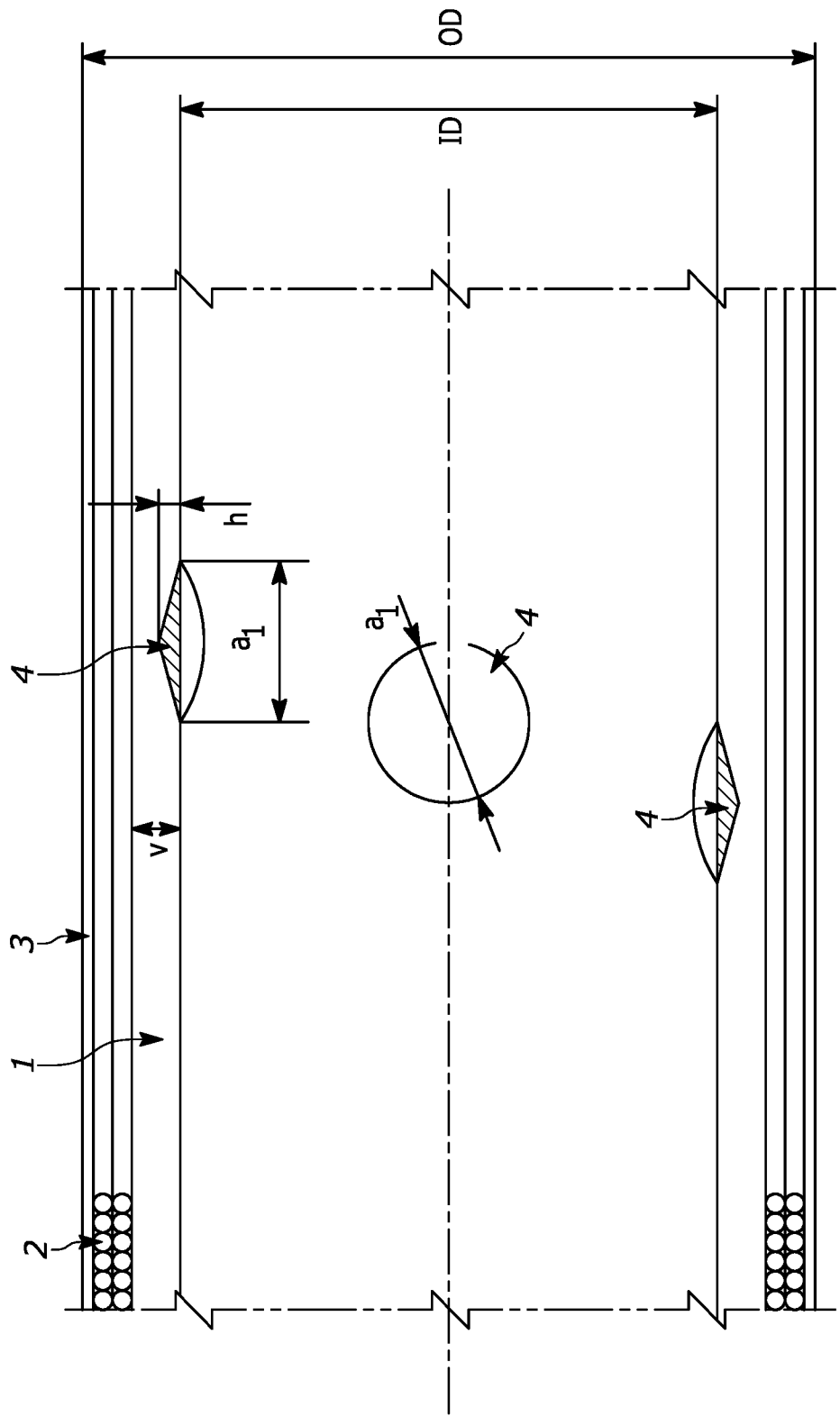
FIG. 3 shows a longitudinal section of a rubber hose that has a liner 1, reinforcing layers 2, a rubber cover 3 and an inner wear indicator 4.

FIG. 3 shows another possible implementation according to the disclosure on a longitudinal section of a rubber hose, which also has a liner 1, reinforcing layer 2, a rubber cover 3, and an inner wear indicator 4. The wear indicators 4 on the inner side are integrated as cone-shaped wear indicator spots with diameters of $a_1$, heights of h and with distinct color.

Figure 4:
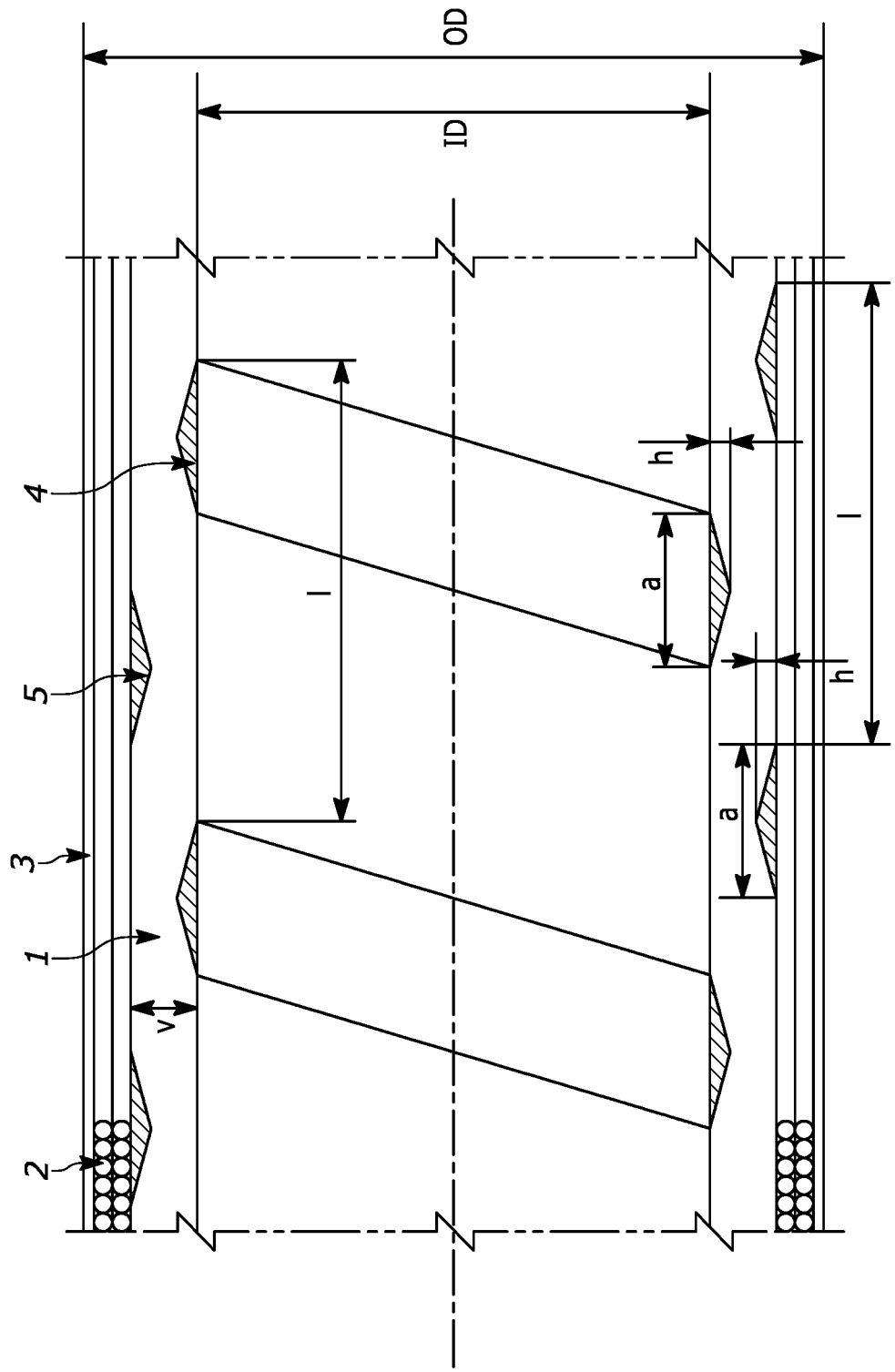
FIG. 4 shows a possible implementation according to the disclosure on a longitudinal section of a rubber hose, which has a liner 1, reinforcing layers 2 and a rubber cover 3.

FIG. 4 shows a possible implementation according to the disclosure on a longitudinal section of a rubber hose, which has a liner 1, reinforcing layers 2 and a rubber cover 3. On the inner side of the liner there is an integrated inner wear indicator 4 profile with a width of a, a height of h and a triangular cross section, laid in spiral form and a pitch of I. On the outer side of the liner there is an integrated outer wear indicator 5 profile with a width of a, a height of h and a triangular cross section, laid similarly in spiral form and a pitch of I. For practical purposes the profile tip on the outer liner points towards the hose axis, and the outer wear indicator 4 profile and the inner wear indicator 4 profile have different color.

Figure 5:
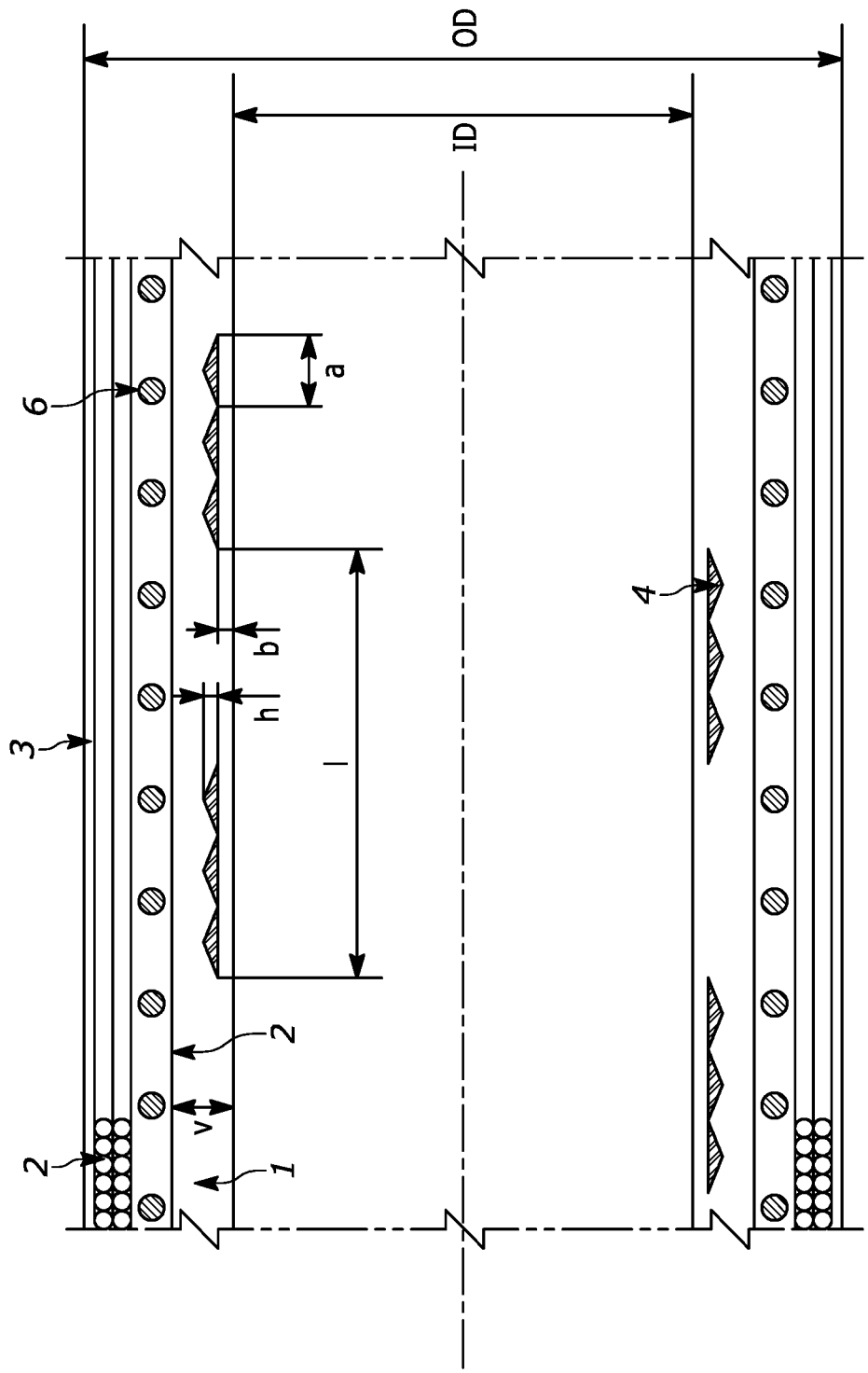
FIG. 5 shows one possible implementation according to the disclosure on a longitudinal section of a rubber hose, which has a liner 1, reinforcing layers 2, a stiffening helix 6 and a rubber cover 3.

FIG. 5 shows one possible implementation according to the disclosure on a longitudinal section of a rubber hose, which has a liner 1, reinforcing layers 2, a stiffening helix 6 and a rubber cover 3. The inner side of the liner is continuous; the inner wear indicator 4 profile with a multiple triangular cross-section is placed radially with a distance of b from the liner's inner surface, and consist of three triangular cross-sectioned parts with a width of a and a height of h. Its color differs from the color of the liner. It is integrated in a spiral form, with a pitch of I. In the hose according to the disclosure, if the wear indicator is placed on the inner surface of the liner, then the changes of the profile width (or the diameter of the conical wear indicator) enables one to easily calculate the rate of wear.

If, after t operation time, the width of the wear indicator 4 profile, as shown in FIGS. 1 through 5, decreases from value a to at, then the k rate of wear is calculated as follows:

$$k=h(a-a_t)/(a_t)$$

The equation can also be used for the conical wear indicators 4 using an analogue method. Using one implementation of a method according to the disclosure, demonstrated in FIG. 4, the total lifespan of the hose may be calculated, i.e. the remaining potential lifespan until the liner wears out completely. If the visible width of the outer indicator 5 profile at time x is $a_x$, then the remaining potential lifespan until completely wearing out, $t_c$, can be determined using the following equation:

$$t_c=h(a-a_x)/(ak)$$

This naturally presupposes that k rate of wear is determined beforehand.

Figure 6:
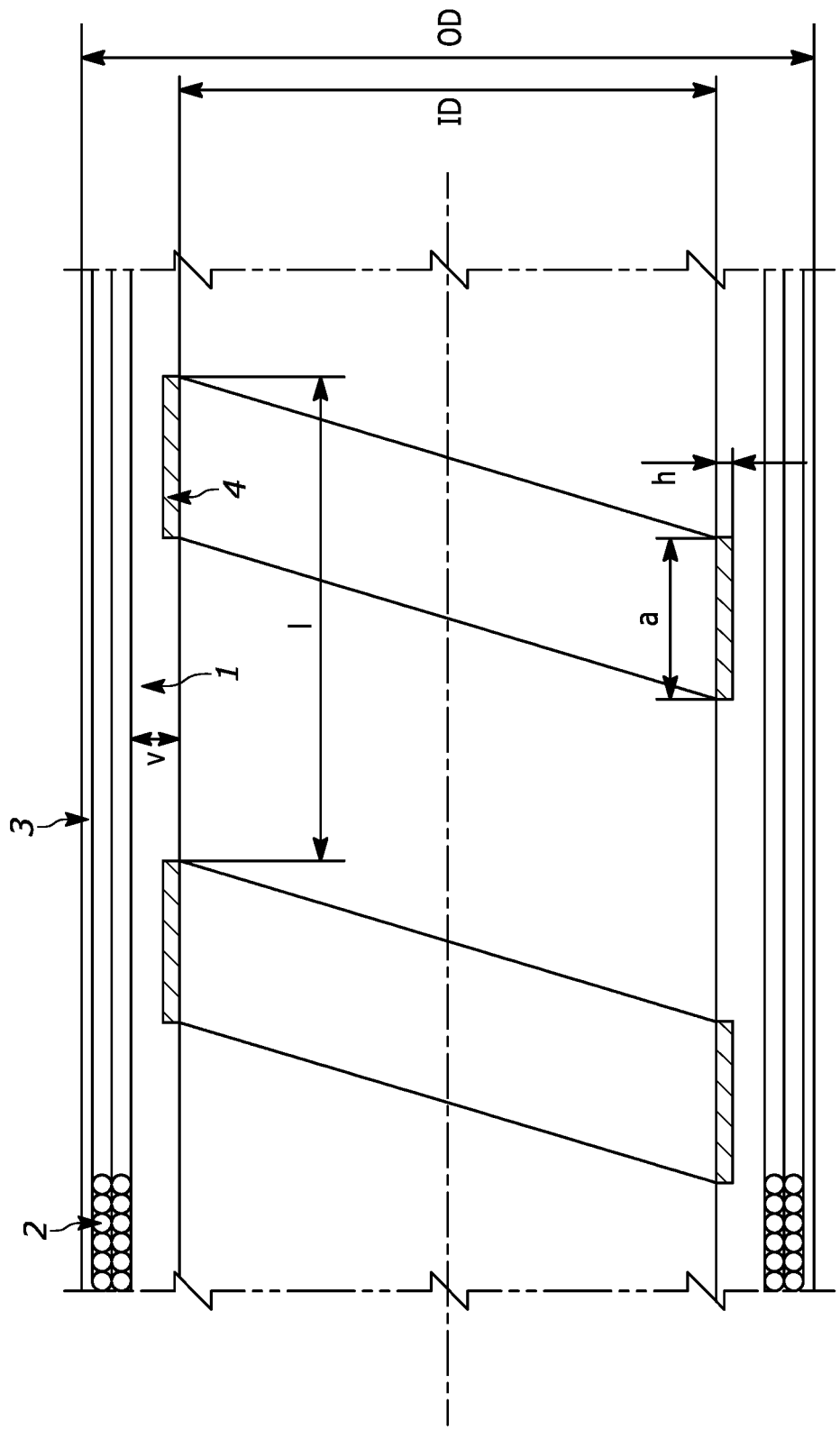
FIG. 6 shows an implementation according to the disclosure on a longitudinal section of a rubber hose, which has a liner 1, reinforcing layers 2 and a rubber cover 3.

FIG. 6 shows a preferred implementation according to the disclosure on a longitudinal section of a rubber hose, which has a liner 1, reinforcing layers 2 and a rubber cover 3. An integrated inner wear indicator 4 profile is placed on the inner side of the liner, with a width of a, a height of h and a rectangular cross section, with a spiral form and a pitch of I.

Figure 7:
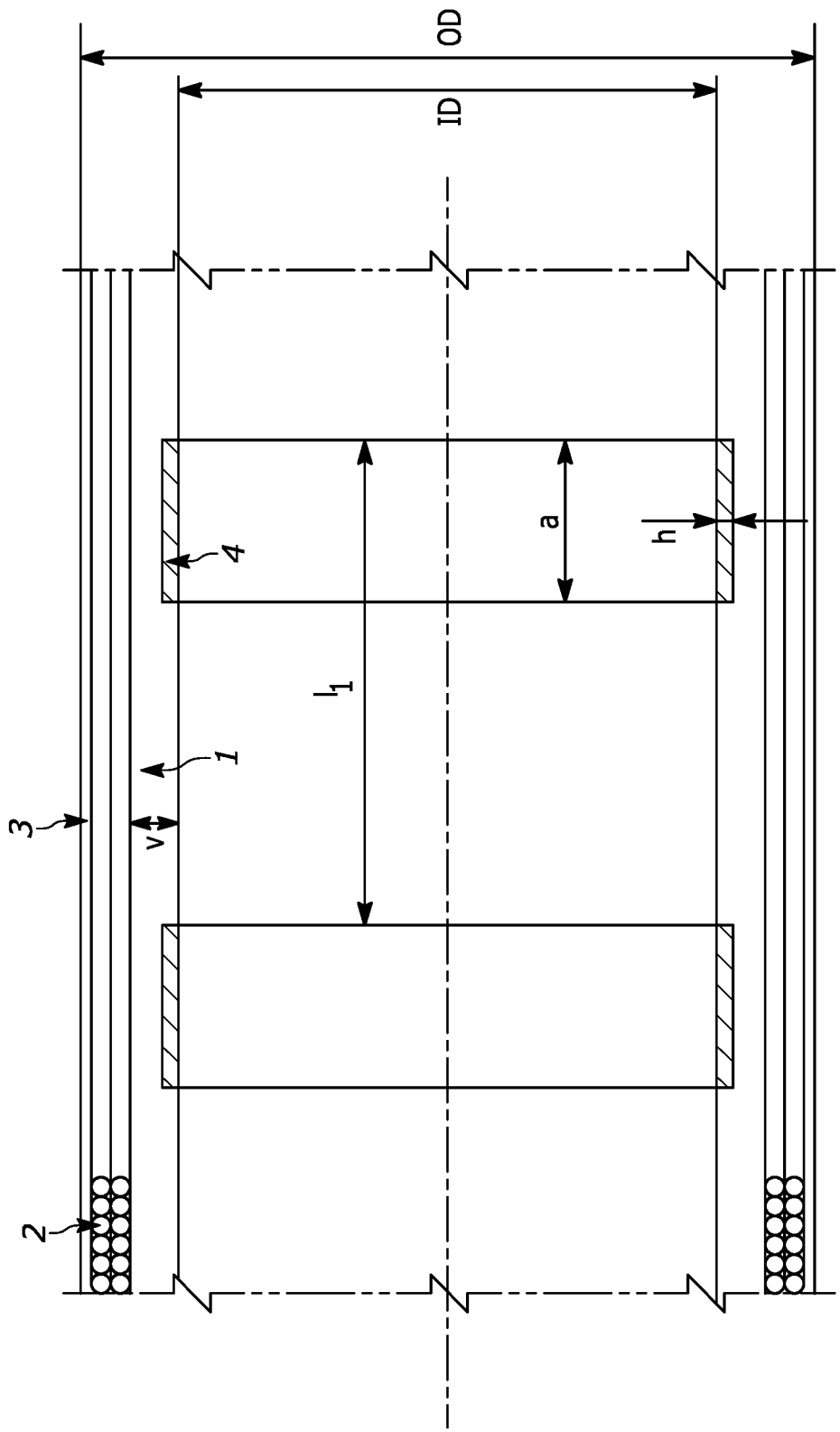
FIG. 7 shows another possible implementation according to the disclosure on a longitudinal section of a rubber hose, which also has a liner 1, reinforcing layers 2 and a rubber cover 3.

FIG. 7 shows another possible implementation according to the disclosure on a longitudinal section of a rubber hose, which also has a liner 1, reinforcing layers 2 and a rubber cover 3. An integrated inner wear indicator 4 profile of distinct color is placed on the inner side of the liner with a width of a, a height of h and a rectangular cross section, perpendicular to the hose axis in a tangential direction and with a repeat distance of h.

The hoses are inspected regularly after each job. If, after t operation time, the complete thickness h of the wear indicator 4 profile washes away and the underlying liner 1 starts to show, then the k rate of wear is calculated as follows:

$$k=h/t$$

Using an implementation method according to the disclosure, demonstrated in FIGS. 6 and 7, the total lifespan of the hose may be calculated, i.e. the remaining potential lifespan until the liner wears out completely. After t operation time the remaining thickness of the liner 1 is v−h.

Hence the remaining potential lifespan of the hose can be calculated as:

$$t_c=(v-h)/k$$

The rubber hose according to some aspects of the disclosure has a distinctly colored inner wear indicator 4, integrated into the liner 1, with the following feature: the b distance of the inner wear indicator 4 from the inner surface of the liner 1 is smaller than about 40% of v liner thickness, and the h height of the wear indicator, measured perpendicularly to the hose axis, falls between about from 1% to about 90% of v liner thickness. In some aspects, the distance b of the inner wear indicator 4 from the inner surface of the liner 1 is equal to or less than about 20% of the liner thickness v, and the height h of the wear indicator 4, measured perpendicularly to the hose axis, is from about 10% to about 40% of the liner thickness v.

According to a realization of the disclosure, the sectional surface area of the inner wear indicator 4 changes with its radial distance to the hose axis. According to another realization of the disclosure, the sectional surface area of the inner wear indicator 4 inside the rubber hose, located concentrically to the liner, gradually decreases as a function of its radial distance to the hose axis.

According to another realization according to the disclosure, the profile of the inner wear indicator 4 in the rubber hose has a triangular cross-section and the indicator laid in spiral. According to yet another realization according to the disclosure, the profile of the inner wear indicator 4 in the rubber hose has a multiple triangular cross-section and the indicator laid in spiral.

According to another realization according to the disclosure, the profile of the inner wear indicator 4 in the rubber hose has a triangular cross-section, laid in rings perpendicularly to the hose axis. According to yet another realization according to the disclosure, the profile of the inner wear indicator 4 in the rubber hose has a multiple triangular cross-section with a ring-like shape, placed perpendicularly to the hose axis.

According to another according to the disclosure, the inner wear indicator 4 in the rubber hose consists of essentially conical elements placed in a spot-like pattern.

According to another realization according to the disclosure, the rubber hose with wear indicator 4 features an additional outer wear indicator 5, placed more outward radially to the hose axis than the wear indicator 4.

According to another realization of the disclosure, the surface of the outer wear indicator 5 within the rubber hose with inner wear indicator 4, gradually increases in a radial direction to the hose axis as a function of its distance from the hose axis.

According to another preferred realization according to the disclosure, the profile of the inner wear indicator 4 in the rubber hose has a rectangular cross-section and the indicator laid in spiral. According to another realization according to the disclosure, the profile of the inner wear indicator 4 in the rubber hose has a rectangular cross-section, laid in rings perpendicularly to the hose axis.

In yet another aspect of the disclosure, includes adding embossed rubber grooves to the liner material during manufacturing that would wash away as the product is exposed to the high velocity fluids. The grooves may be machined to the mandrel the hose is built on, hence mirroring the grooves to the rubber liner.

The material of the liner and the inner 4 and outer 5 wear indicators may be of any vulcanized or cured rubber compound, such as those based upon styrene-butadiene copolymer, polybutadiene, natural rubber, synthetic polyisoprene, but may also be oil-resistant polychloroprene, nitrile rubber, hydrogenated nitrile rubber, chlorinated or sulphochlorinated polyethylene, acrylate rubber, fluorinated elastomer etc. The material of the liner may be the blend of different rubbers.

According to the disclosure, the reinforcing layers 2 maybe be steel wires, cables, steel cords or textile cords and other structures made out of textile polyester, polyamide, aramid, or other artificial or natural fibers embedded in rubber.

According to the disclosure, the hose may contain additional elements, e.g. rubberized load distributing textile layers, reinforcing helices, steel or composite rings, stainless steel external wrap, plastic spiral guard cover, a rubber cover 3 etc.

Figure 8:
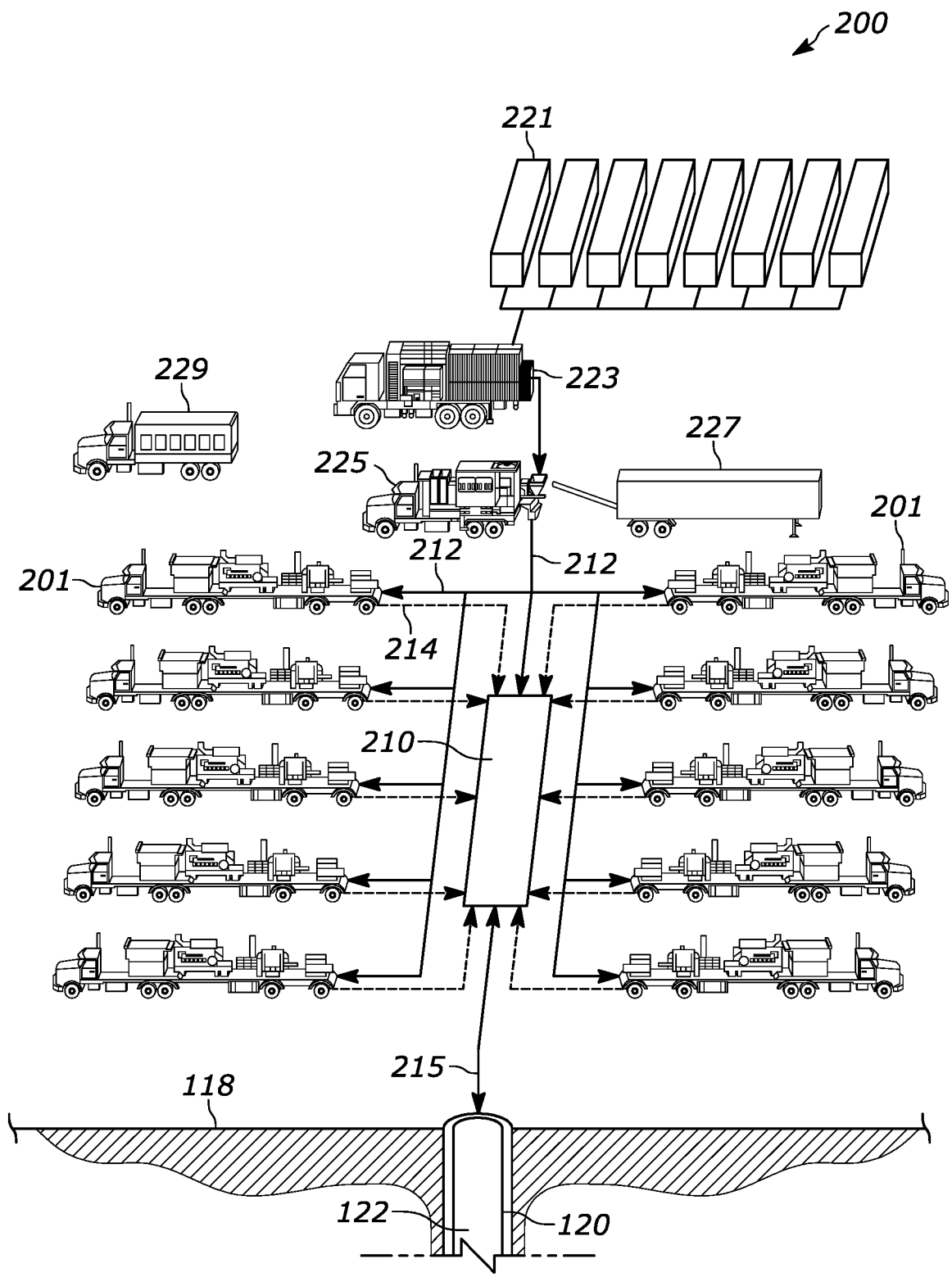
FIG. 8 shows an oilfield fluid pumping system for pumping a fluid from a surface of a well site to a wellbore during an oilfield operation.

Now referencing FIG. 8 which shows an oilfield fluid pumping system 200 for pumping a fluid from a surface 118 of a well site 120 to a wellbore 122 during an oilfield operation. In this particular example, the operation is a hydraulic fracturing operation, and hence the fluid pumped is a fracturing fluid. As shown, the pump system 200 includes a plurality of water tanks 221, which feed water to a gel maker 223. The gel maker 223 combines water from the tanks 221 with a gelling agent to form a gel. The gel is then sent to a blender 225 where it is mixed with a proppant from a proppant feeder 227 to form a fracturing fluid. The gelling agent increases the viscosity of the fracturing fluid and allows the proppant to be suspended in the fracturing fluid. It may also act as a friction reducing agent to allow higher pump rates with less frictional pressure.

The fracturing fluid is then pumped at low pressure (for example, around 60 to 120 psi) from the blender 225 to a plurality of plunger pumps 201 as shown by solid lines 212. As shown in FIG. 8, each plunger pump 201 receives the fracturing fluid at a low pressure and discharges it to a common manifold 210 (sometimes called a missile trailer or missile) at a high pressure through hoses according to the disclosure, shown by dashed lines 214. The missile 210 then directs the fracturing fluid from the plunger pumps 201 to the wellbore 122 as shown by solid line 215.

According to another aspect of the disclosure, some hose embodiments may be used for combined flow from a so-called zipper manifold to a wellhead. A zipper manifold is a system of fracturing equipment valves that directs fracturing treatment fluid from the missile to multiple wellbores. The zipper manifold facilitates quick redirection of fracturing pressure from one well to another, enabling pump trucks to run nearly continuously to minimize downtime. Hose embodiments according to the disclosure may also be used from the missile 210 to the pipework, to reduce vibration on pipework. In yet other embodiments, hoses according to the disclosure may be used to connect fluid flow from the missile to one or more wellheads, replacing all pipework and the zipper manifold.

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A rubber hose comprising a distinctly colored inner wear indicator integrated into a liner of the rubber hose, wherein the inner wear indicator is disposed at a distance (b) of the from an inner surface of the liner, wherein (b) is less than 40% of thickness (v) of the liner, and wherein height (h) of the wear indicator, measured perpendicularly to a longitudinal axis of the hose, falls between 1% to 90% of liner thickness (v); and wherein the inner wear indicator has a profile applied in a spiral and has a triangular cross-section.

2. The rubber hose according to claim 1, wherein a concentric sectional surface area of the inner wear indicator changes with radial distance from the longitudinal axis.

3. The rubber hose according to claim 2, wherein the concentric sectional surface area of the inner wear indicator gradually decreases in the radial direction as a function of distance from the longitudinal axis.

4. A rubber hose comprising a distinctly colored inner wear indicator integrated into a liner of the rubber hose, wherein the inner wear indicator is disposed at a distance (b) of the from an inner surface of the liner, wherein (b) is less than 40% of thickness (v) of the liner, and wherein height (h) of the wear indicator, measured perpendicularly to a longitudinal axis the hose, falls between 1% to 90% of liner thickness (v); and wherein the inner wear indicator profile is applied in a spiral and has a multiple triangular cross-section.

5. A rubber hose comprising a distinctly colored inner wear indicator integrated into a liner of the rubber hose, wherein the inner wear indicator is disposed at a distance (b) of the from an inner surface of the liner, wherein (b) is less than 40% of thickness (v) of the liner, and wherein height (h) of the wear indicator, measured perpendicularly to longitudinal axis of the hose, falls between 1% to 90% of liner thickness (v); and wherein the inner wear indicator in the rubber hose has a triangular cross-section laid in ring-like shape, perpendicular to the longitudinal axis or a rectangular cross section laid in ring-like shape.

6. The rubber hose according to claim 1, wherein the inner wear indicator in the rubber hose consists of essentially conical elements placed in a spot-like pattern.

7. The rubber hose according to claim 1, wherein an additional outer wear indicator is placed radially to the longitudinal axis and more outward than the inner wear indicator.

8. The rubber hose according to claim 7, wherein a sectional surface area of the outer wear indicator gradually increases in a radial direction relative the longitudinal axis as a function of distance from the longitudinal axis.

9. The rubber hose according to claim 1, wherein the distance (b) of the inner wear indicator from the inner surface of the liner is equal to or less than 20% of the liner thickness (v), and the height (h) of the wear indicator, measured perpendicular to the hose longitudinal axis, is from 10% to 40% of the liner thickness (v).

10. The rubber hose according to claim 1, wherein the rubber hose is connected at one end to a plunger pump and wherein the rubber hose is connected at a second to a common manifold, in an oilfield pump system.

11. A rubber hose comprising a distinctly colored inner wear indicator integrated into a liner of the rubber hose, wherein the inner wear indicator is disposed at a distance (b) of the from an inner surface of the liner, wherein (b) is less than 40% of thickness (v) of the liner, and wherein a height (h) of the wear indicator, measured perpendicularly to a longitudinal axis of the hose, falls between 1% to 90% of liner thickness (v); and, wherein the inner wear indicator has profile which is:
 applied in a spiral and has a triangular cross-section,
 applied in a spiral and has a multiple triangular cross-section,
 a triangular cross-section laid in ring-like shape, perpendicular to the longitudinal axis,
 a multiple triangular cross-section laid in a ring-like shape, placed perpendicular to the longitudinal axis, or
 essentially conical elements placed in a spot-like pattern.

12. The rubber hose according to claim 11, wherein a concentric sectional surface area of the inner wear indicator changes with radial distance from the longitudinal axis.

13. The rubber hose according to claim 12, wherein the concentric sectional surface area of the inner wear indicator gradually decreases in the radial direction as a function of distance from the longitudinal axis.

14. The rubber hose according to claim 11, wherein an additional outer wear indicator is placed radially to the longitudinal axis and more outward than the inner wear indicator, and wherein a sectional surface area of the outer wear indicator gradually increases in a radial direction relative the longitudinal axis as a function of distance from the longitudinal axis.

15. The rubber hose according to claim 11 further comprising one or more embossed rubber grooves in the liner which function to wash away as the liner is exposed to the high velocity fluids.

16. The rubber hose according to claim 11, wherein the rubber hose is connected at one end to a plunger pump and wherein the rubber hose is connected at a second to a common manifold, in an oilfield pump system.

* * * * *